March 6, 1928.  1,661,792
W. P. ELWOOD
ROUNDER FOR PLASTIC MATERIAL
Filed May 25, 1927
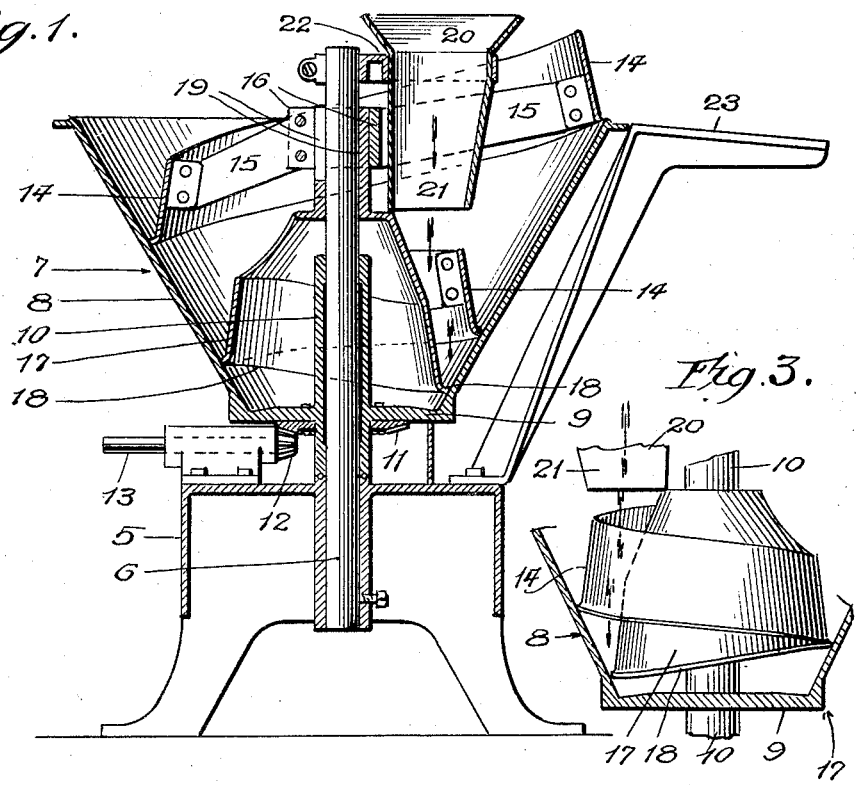
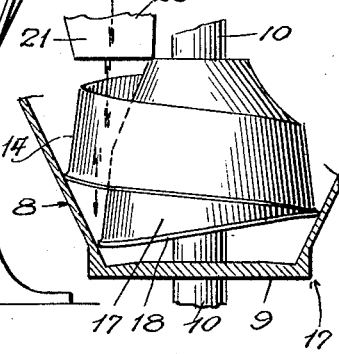
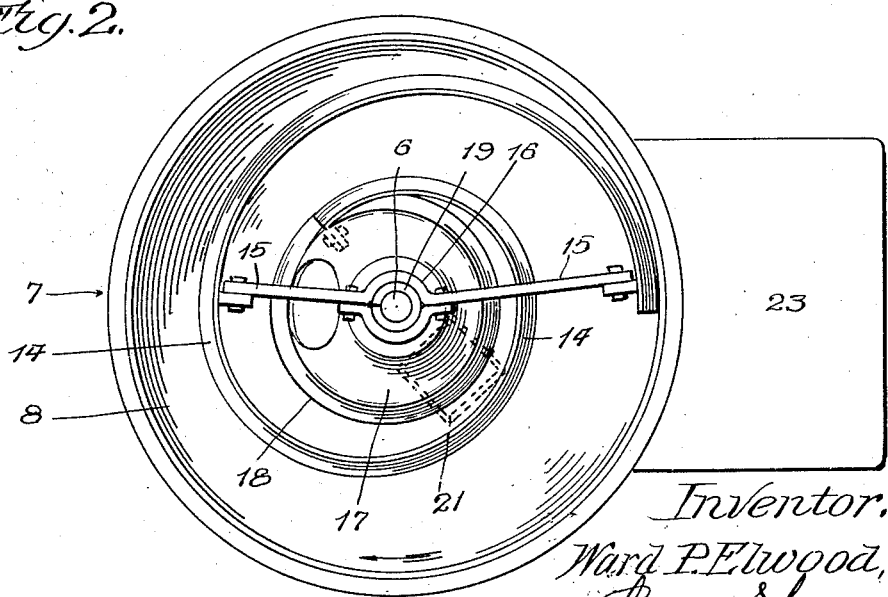
Inventor:
Ward P. Elwood,
by Charles C. Showey
his Atty.

Patented Mar. 6, 1928.

1,661,792

UNITED STATES PATENT OFFICE.

WARD P. ELWOOD, OF JOLIET, ILLINOIS, ASSIGNOR TO UNION MACHINERY COMPANY, OF JOLIET, ILLINOIS, A CORPORATION OF ILLINOIS.

ROUNDER FOR PLASTIC MATERIAL.

Application filed May 25, 1927. Serial No. 194,040.

This invention relates to rounders for plastic material. Rounders of this class are employed for "rounding up" lumps of plastic material of irregular shape to thereby impart to the material a more nearly rounded condition and to give it skin like surface texture. Rounding up machines of the present type are employed for rounding up lumps of dough in the preparation of bread, buns and the like and although the invention has been shown and described in the present case in connection with a rounder for rounding up lumps of dough, it is to be understood that it is not my intention to limit myself to a machine for rounding up lumps of dough.

The principal object of the present invention is to speed up the movement of the lumps of the dough at the start of their passage through the machine, whereby any tendency for two lumps of dough to become intermingled or bunched together is entirely eliminated. In the type of dough rounders where a rotary dough carrier of inverted conical formation is employed in connection with a co-operating, stationary, spiral mould board within the bowl, some difficulty has been encountered by reason of the fact that some times the lumps of dough fail to start up the inclined spiral trough formed by the internal face of the carrier and the face of the mould board, with the result that some times a lump of dough became intermingled or bunched with a preceding lump of dough. In accordance with the present invention, means is provided at the receiving end or initial end of the spiral mould board, whereby the lumps of dough are started up the inclined spiral trough, the moment they fall into the trough, whereby any possibility of two lumps of dough becoming intermingled is entirely eliminated. The invention consists, therefore, in a rounder for plastic material, embodying a carrier having an internal surface of inverted conical formation, co-operating with a spiral mould board contacting with said surface and having at its receiving end a cone like portion, the lower edge of which contacts solely with the internal, inclined surface of the carrier, thereby forming a substantially V shaped trough, commencing at the receiving end of the mould board and extending substantially throughout its entire extent. It further consists in a rounder of the character described, having a hopper through which the lumps of material are delivered to the rounding up surfaces of the machine, the discharge end of the hopper being located in a position to deliver the lumps into the trough between the stationary cone like portion and internal inverted cone like surface of the carrier. The invention further consists in the several novel features of construction, arrangement and combination of parts hereinafter fully set forth and claimed.

The invention is clearly illustrated in the drawing accompanying this specification, in which:

Fig. 1 is a vertical cross section taken through a rounder embodying a simple form of the present invention; Fig. 2 is a plan thereof with the hopper removed and showing the location of its discharge end in dotted lines and Fig. 3 is a view partly in side elevation and partly in central vertical section of the carrier, the cone like portion, and fragments of the mould board and the hopper.

Referring to said drawing, which illustrates a simple embodiment of the present invention, the reference character 5 designates a base of suitable shape and proportions in which is rigidly mounted an upright stationary post 6 which may be in the form of a round rod, tube or shaft. Rotatively mounted on the base and in co-axial alignment with said post 6, is a carrier 7, here shown in the form of a hollow, inverted cone like member, comprising the flaring or inclined wall 8, the bottom 9 and the sleeve 10 which surrounds the post 6. Anti-friction bearings may be provided between the lower end of the sleeve 10 and base 5. Means are provided for rotating the carrier 7, and a simple form of means comprises a beveled gear ring 11 secured upon the lower face of the bottom 9 and a beveled pinion 12 meshing with said beveled gear ring 11 and mounted upon a shaft 13 journaled in a bearing carried by the base and driven from any suitable source of power.

Stationarily mounted upon said post 6 is a mould board 14, preferably of spiral formation extending from the lower and smaller end of the carrier 7, to its upper edge and contacting, throughout its entire extent, along its lower edge, with the internal, conical face of the carrier. As a preference, the mould board slopes inwardly towards the axis of the post thereby forming an inclined stationary and spirally arranged surface which co-operates with the inclined rotating internal surface of the carrier to round up lumps of dough. The mould board is secured to and stationarily supported by the central post 6, and as shown is rigidly connected thereto by arms 15, which have hubs or sleeves 16 clamped or otherwise secured upon the post 6.

At the lower or receiving end of the mould board 14, it has a cone like portion 17, which is made hollow and surrounds the central post 6 with its lower edge held in contact with the inclined or sloping internal face of the carrier, thereby forming with said face a substantially V shaped trough at all places where the cone shaped portion of the mould board contacts with said carrier. The cone like portion 17 entirely covers the bottom 9 of the carrier and prevents the lumps of dough from coming into contact with said bottom. As a preference the lower edge 18 of the cone like portion 17 lies in an inclined plane whereby the trough formed by the carrier and cone like portion assumes an inclined spiral like form, which merges into the spiral trough formed between the main portion 14 of the mould board and the carrier. Preferably the cone like portion 17 is disposed eccentrically with respect to the axis of rotation of the carrier, whereby its lower edge may contact with the internal face of the carrier along a spiral plane which merges into the spiral plane taken by the lower edge of the main portion of the spiral mould board. The mould board may be made in sections if desired, bolted or otherwise secured together and the main part 14 of the mould board may be separate from the cone like portion 17 and bolted or otherwise secured thereto in any suitable manner. If desired, the cone like portion may be formed with a split sleeve 19 surrounding the post 6 and clamped thereto by the hub or sleeve 16 of the supporting arm 15, or it may be secured to the post in any other desirable manner.

Mounted upon the post 6 is a hopper 20 into which the rough lumps of dough are delivered from a belt or other conveyor (not shown) as is well understood and said hopper has a discharge end 21 located over the inclined side of the cone like portion 17 or at least located thereabove in such position that lumps of dough discharging from the discharge end of the hopper fall into the substantially V shaped trough formed between the cone like portion 17 of the mould board and the inclined internal surface of the carrier. An arm or other support 22 is provided for supporting the hopper in position and said arm is adjustably secured upon the post 6 whereby the location of the hopper may be varied along a curved line concentric with the axis of the post 6.

A table or other receiving element 23 is provided for receiving the rounded up lumps of dough at the upper or discharge end of the spiral mould board.

In the operation of the rounder, the carrier 7 is rotated upon its vertical axis and lumps of dough are fed to the machine, one at a time, and often in close succession and they are delivered into the hopper 20, through which they discharge directly into the substantially V shaped trough at the lower end of the carrier. In falling into the substantially V shaped trough they become firmly pressed against the internal face of the carrier and are therefore instantly started along the inclined trough between the sloping faces of the cone like portion 17 and carrier 7. Each lump of dough is therefore started up the inclined trough before a succeeding lump reaches the trough and consequently the lumps of dough are kept in spaced relation to each other, the distance between them increasing as they travel up the inclined spiral trough, where they are rounded up in the well known and customary manner in machines of this type. At the upper or discharge end of the mould board, the rounded up lumps of dough are discharged upon the table 23 or other receiver and conveyed away for subsequent operations.

The use of the cone like portion 17 of the mold board, contacting with the inclined internal face of the carrier, prevents any lag in the movement of the lumps of dough after they have been deposited on the carrier, thereby effectively preventing two or more lumps from becoming intermingled or bunched together. When intermingled, the attendant must separate them, and send them through the rounder again, which takes up his time and delays the work.

More or less variation of the exact details of construction is possible without departing from the spirit of this invention; I deside, therefore, not to limit myself to the exact form of the construction shown and described, but intend, in the following claims, to point out all of the invention disclosed herein.

I claim as new, and desire to secure by Letters Patent:

1. A rounder for plastic material comprising in combination, a rotary carrier having an internal surface of inverted conical formation, and a stationarily supported mold board therein, of spiral formation throughout the major portion of its extent contacting with said internal surface of the carrier, said mold board having a cone like portion at its receiving end contacting with said internal conical face of the carrier.

2. A rounder for plastic material comprising in combination, a rotary carrier having an internal surface of inverted conical formation, and a stationarily supported mold board therein, of spiral formation throughout the major portion of its extent and contacting with said internal surface of the carrier and having a cone like portion at its receiving end contacting along its lower edge solely with said internal surface of the carrier.

3. A rounder for plastic material comprising in combination, a rotary carrying bowl, having an internal surface of inverted conical form, and a horizontal bottom, a stationarily supported mold board therein of spiral formation throughout the major portion of its extent and contacting with said internal surface of the carrier, said mold board having a cone like portion at its receiving end covering the bottom of said bowl, the lower edge of said cone like portion contacting solely with said internal face of the carrying bowl.

4. A rounder for plastic material comprising in combination, a rotary carrier having an internal surface of inverted conical formation, and a stationarily supported mold board therein, of spiral formation throughout the major portion of its extent contacting with said internal surface of the carrier, said mold board having a cone like portion at its receiving end eccentrically disposed with respect to the axis of the carrier and contacting with said internal face of the carrier.

5. A rounder for plastic material comprising in combination, a rotary carrier having an internal surface of inverted conical formation, and a stationarily supported mold board therein, of spiral formation throughout the major portion of its extent contacting with said internal surface of the carrier, said mold board having a cone like portion at its receiving end eccentrically disposed with respect to the axis of the carrier and contacting solely with said internal face of the carrier.

6. A rounder for plastic material comprising in combination, a rotary carrier having an internal surface of inverted conical formation, a stationarily supported mold board therein, of spiral formation throughout the major portion of its extent contacting with said internal surface of the carrier, said mold board having a cone like portion at its receiving end contacting with said internal conical face of the carrier and a hopper having its discharge end located over the inclined face of the cone shaped portion of the mold board.

7. A rounder for plastic material comprising in combination, a rotary carrier having an internal surface of inverted conical formation, a stationarily supported mold board therein, of spiral formation throughout the major portion of its extent contacting with said internal surface of the carrier, said mold board having a cone like portion at its receiving end eccentrically disposed with respect to the axis of the carrier and contacting with said internal conical face of the carrier along a spiral line and a hopper having its discharge end located over the inclined side of the cone like portion and adjustable along a curved line concentric with the axis of the carrier.

8. A rounder for plastic material comprising a base, a post secured thereto and extending up therefrom, a rotatory carrier coaxial with said post and rotatively mounted on said base and having an inclined internal face, a mold board of spiral formation stationarily mounted on said post and contacting along its lower edge with the internal inclined face of said carrier, said mold board having a cone like lower portion at its receiving end eccentrically disposed with respect to the axis of the carrier and contacting solely with the internal face of the carrier along a spiral line, and a hopper having its discharge end located over the trough formed between the carrier and cone like portion of the mold board.

WARD P. ELWOOD.